(12) United States Patent
Cho et al.

(10) Patent No.: US 9,183,956 B2
(45) Date of Patent: Nov. 10, 2015

(54) MACHINING, EXAMINATION, AND WELDING INTEGRAL DEVICE FOR NOZZLE

(71) Applicant: Korea Plant Service & Engineering Co., Ltd., Seongnam-si, Gyeonggi-do (KR)

(72) Inventors: Hong Seok Cho, Yongin-si (KR); Jang Wook Lee, Seongnam-si (KR); Ki Hyun Cho, Seoul (KR); Sang Hoon Choi, Yongin-si (KR); Min Hwan Mo, Gwangju (KR); Kyong Soon Jang, Suwon-si (KR)

(73) Assignee: KOREA PLANT SERVICE & ENGINEEERING CO., LTD, Seongnam-si (KR)

( * ) Notice: Subject to any disclaimer, the term of this patent is extended or adjusted under 35 U.S.C. 154(b) by 391 days.

(21) Appl. No.: 13/832,871

(22) Filed: Mar. 15, 2013

(65) Prior Publication Data

US 2014/0150228 A1    Jun. 5, 2014

(30) Foreign Application Priority Data

Nov. 30, 2012    (KR) .................. 10-2012-0137777

(51) Int. Cl.
  *B23K 28/02* (2014.01)
  *B23K 31/00* (2006.01)
  *B23P 23/00* (2006.01)
  *G21C 17/017* (2006.01)
  (Continued)

(52) U.S. Cl.
  CPC .......... *G21C 19/207* (2013.01); *B23K 26/0093* (2013.01); *B23K 37/0276* (2013.01); *G21C 17/017* (2013.01); *G21C 19/14* (2013.01); *F16L 55/18* (2013.01); *Y10T 29/5143* (2015.01); *Y10T 29/5176* (2015.01); *Y10T 29/5199* (2015.01)

(58) Field of Classification Search
  CPC ............ Y10T 29/5199; Y10T 29/5137; Y10T 29/5143; Y10T 29/5168; B23K 26/0093
  USPC ............................. 29/33 T, 564.1, 564.7, 50
  See application file for complete search history.

(56) References Cited

U.S. PATENT DOCUMENTS

| | | | |
|---|---|---|---|
| 8,881,355 B2 * | 11/2014 | Onishi | ........................... 29/33 T |
| 2009/0166338 A1 * | 7/2009 | Sato | ............................. 219/76.1 |

FOREIGN PATENT DOCUMENTS

| | | |
|---|---|---|
| JP | 06123794 | 5/1994 |
| KR | 100809535 B1 | 2/2008 |
| WO | 2007116532 A1 | 10/2007 |

OTHER PUBLICATIONS

"PWSCC of Alloy 600 Components and its Countermeasures in PWRs", by Hwang et al., from "Transactions of the Korean Nuclear Society Spring Meeting", May 2010, pp. 191-192.*

*Primary Examiner* — Erica E Cadugan
(74) *Attorney, Agent, or Firm* — Sughrue Mion, PLLC (57) ABSTRACT

The present invention relates to a machining, examination, and welding integral device for a nozzle, and more particularly, to a machining, examination, and welding integral device for a nozzle in which machining, examination, and welding can be made in the nozzle by one device. To this end, there is provided a machining, examination, and welding integral device for a nozzle including: a pair of caps provided to be separated from each other; a welding unit provided between the pair of caps to weld a junction part of the nozzle and a pipe; a examination unit coupled to one side of the welding unit to check whether the junction part is defective; and a machining unit coupled to the top of the welding unit to remove the surface of a welded portion of the junction part and/or process the welded portion of the junction part.

8 Claims, 5 Drawing Sheets

(51) Int. Cl.
  *G21C 19/20* (2006.01)
  *B23K 26/00* (2014.01)
  *G21C 19/14* (2006.01)
  *B23K 37/02* (2006.01)
  *F16L 55/18* (2006.01)

MACHINING, EXAMINATION, AND WELDING INTEGRAL DEVICE FOR NOZZLE

CROSS-REFERENCE TO RELATED APPLICATION

This application claims priority to and the benefit of Korean Patent Application No. 10-2012-0137777 filed in the Korean Intellectual Property Office on Nov. 30, 2012, the entire contents of which are incorporated herein by reference.

TECHNICAL FIELD

The present invention relates to a machining, examination, and welding integral device for a nozzle, and more particularly, to a machining, examination, and welding integral device for a nozzle in which machining, examination, and welding can be made in the nozzle by one device.

BACKGROUND OF THE INVENTION

Figure 1:
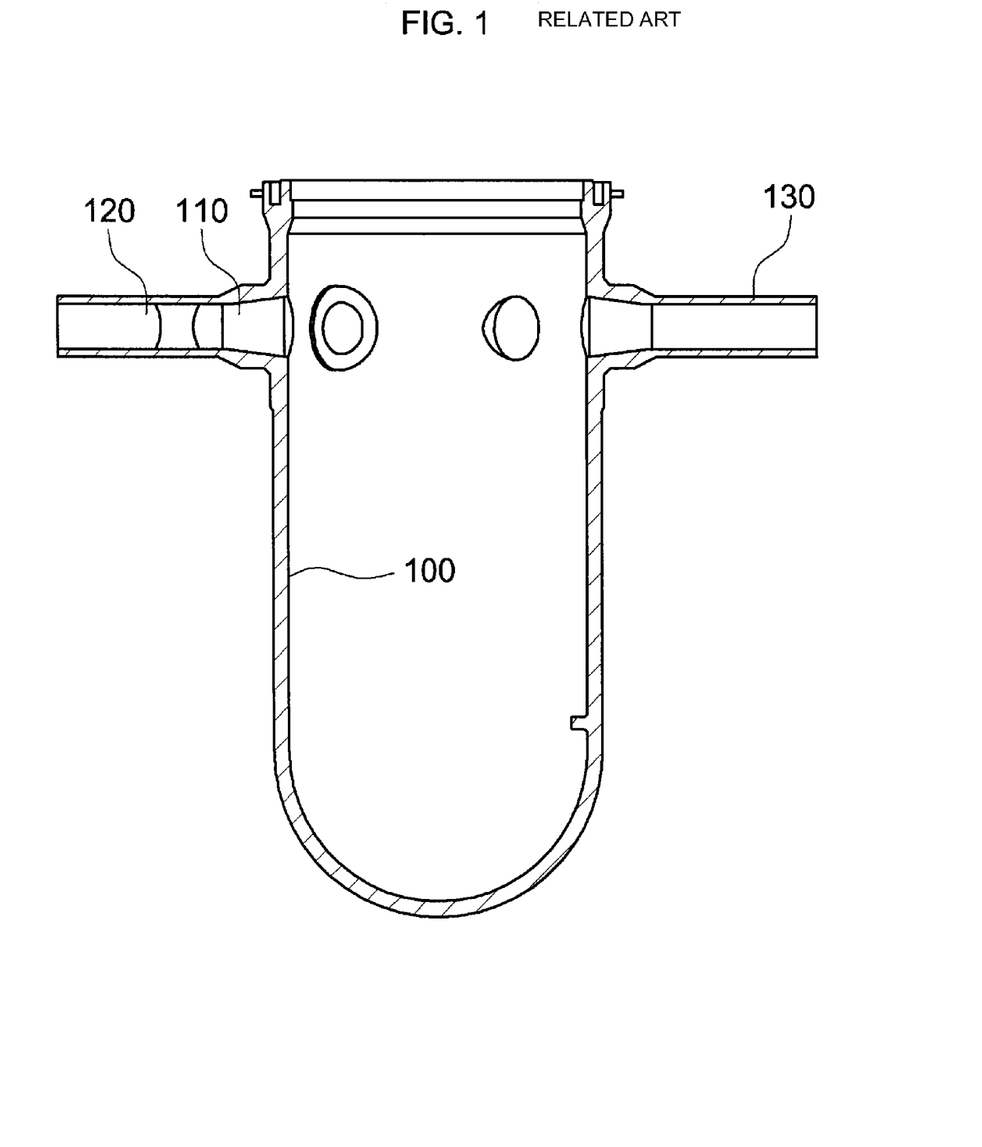
FIG. 1 is a perspective view illustrating a reactor vessel in a nuclear power plant in the related art.

FIG. 1 is a perspective view illustrating a reactor vessel in a nuclear power plant in the related art.

In general, a primary-side main facility of a westinghouse type nuclear power plant includes a reactor vessel 100, and a total of six nozzles 110 of three inlet nozzles and three outlet nozzles on an outer periphery of the top of the reactor vessel 100.

Further, the six nozzles 110 mounted on the reactor vessel 100 and a pipe 130 are connected with each other by a dissimilar metal weld part 120.

Herein, the reactor vessel 100, the pressurizer, the steam generator, the coolant pump, and the like are made of low carbon steel and a main pipe is made of stainless steel.

Further, the dissimilar metal weld parts 120 connecting the nozzle 110 and the pipe 130 are welded to each other by an alloy 82/182 material that can buffer different mechanical properties of materials.

However, according to an apparatus having a configuration in the related art, with an increase in operating years of the nuclear power plant, primary water stress corrosion cracking in the dissimilar metal weld parts 120 gradually increases.

Since an operator needs to approach an inner part of the reactor vessel to replace each of machining, examination, and welding devices which are independently configured according to a required process in order to remove the aforementioned defect, there was a problem in that an error may occur in an operating position according to the device.

Since a safety of the operator is significantly influenced by the vicinity of a nozzle part of the reactor vessel as a zone which is polluted by radioactivity, there was a problem in that it is difficult to perform repairing by hand.

SUMMARY OF THE INVENTION

The present invention is contrived to solve the problem in the related art, and the present invention has been made in an effort to provide a machining, examination, and welding integral device for a nozzle in which a machining device, a examination device, and a welding device are integrally provided in one housing, and as a result, an appropriate device can be used at the same operating position according to a process.

Further, the present invention has been made in an effort to provide a machining, examination, and welding integral device for a nozzle in which an operation is performed by moving the machining, examination, and welding integral device for a nozzle into the nozzle in a reactor vessel with a conveyance positioner to perform a safe operation.

In order to achieve the object, an exemplary embodiment of the present invention provides a machining, examination, and welding integral device for a nozzle including: a pair of caps provided to be separated from each other; a welding unit provided between the pair of caps to weld a junction part of the nozzle and a pipe; a examination unit coupled to one side of the welding unit to examine whether the junction part is defective; and a machining unit coupled to the top of the welding unit to remove the surface of a welded portion of the junction part and/or process the welded portion of the junction part.

Foreign substance preventing layers may be provided on surfaces of the pair of caps facing each other.

A support member may be provided between the welding unit and the foreign substance preventing layer.

The machining, examination, and welding integral device for a nozzle may further include a control unit controlling the welding unit, the machining unit, and the examination unit.

The control unit may include a first control unit connected to the outside to control a machining condition, a welding route, and a welding condition through an embedded program; and a second control unit connected with the first control unit and provided in the cap, and transmitting signals to the examination unit, the welding unit, and the machining unit.

The welding unit, the machining unit, and the examination unit may be rotatable along an inner wall of the nozzle at 360°.

The machining, examination, and welding integral device for a nozzle may be inserted into the nozzle by a conveyance positioner installed in a reactor vessel.

The conveyance positioner may include a seating part on which the machining, examination, and welding integral device for a nozzle is seat for conveyance; a vertical guide unit installed on the bottom of the seating part to vertically drive the seating part; and a rotating plate rotating the seating part.

The junction part may be welded by using alloy 52/152 in order to prevent PWSCC.

According to the machining, examination, and welding integral device for a nozzle of the present invention, there is provided a machining, examination, and welding integral device for a nozzle in which the machining device, the examination device, and the welding device are integrally provided in the housing and the operator performs an operation by controlling the machining device, the examination device, and the welding device through the control unit according to the required process, and as a result, since the operator does not replace the required devices according to the process, the devices required according the processes can perform the operation at the same operating position.

Further, there is provided a machining, examination, and welding integral device for a nozzle in which since the operator does not perform the operation in a zone polluted by radioactivity while an operation is performed by moving the machining, examination, and welding integral device for a nozzle with the conveyance positioner, a safe operation is performed.

DETAILED DESCRIPTION OF THE EMBODIMENTS

Hereinafter, an exemplary embodiment of the present invention will be described in detail with reference to the accompanying drawings and contents to be described below. However, the present invention is not limited to the exemplary embodiment described herein but embodied as another form. Still, the exemplary embodiment introduced herein is provided to make the disclosed contents to be fully complete and the spirit of the present invention is sufficiently conveyed to those skilled in the art. Throughout the specification, like reference numerals refer to like elements.

Figure 2:
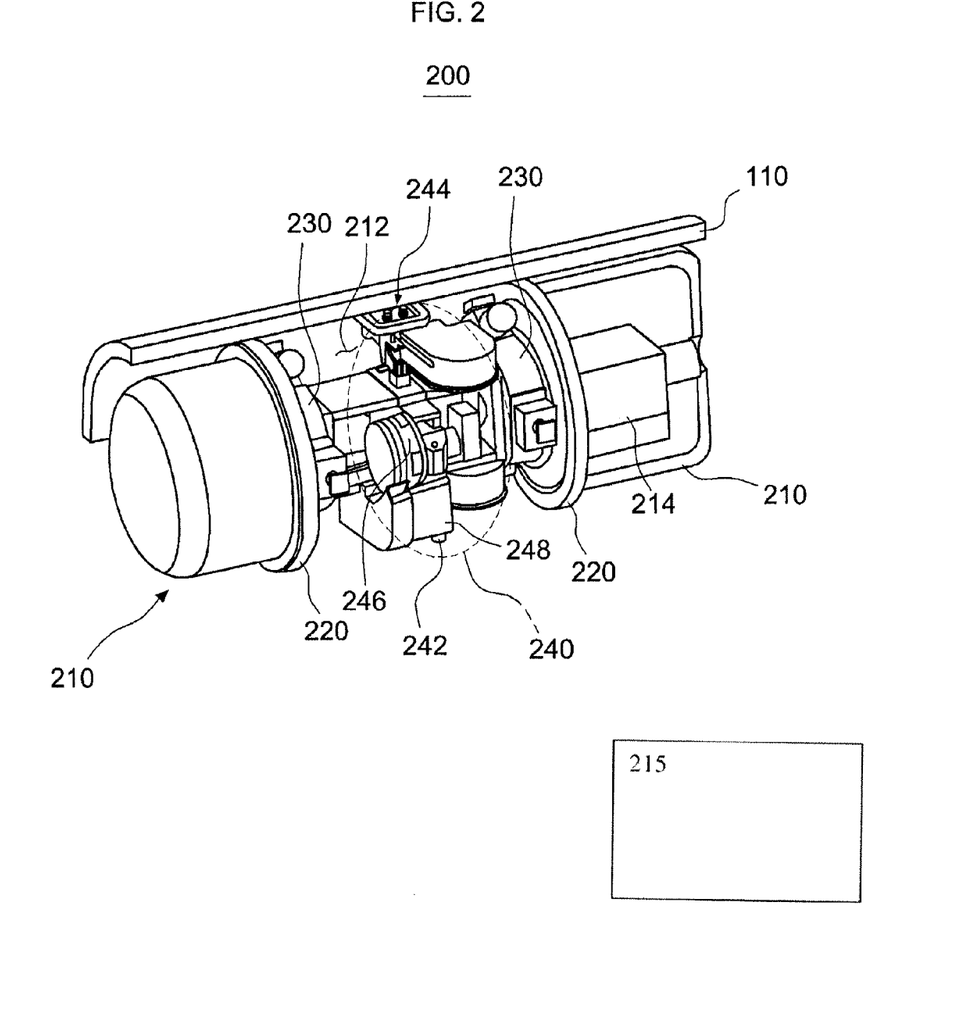
FIG. 2 is a front view illustrating a machining, examination, welding integral device for a nozzle according to the present invention.
Figure 3:
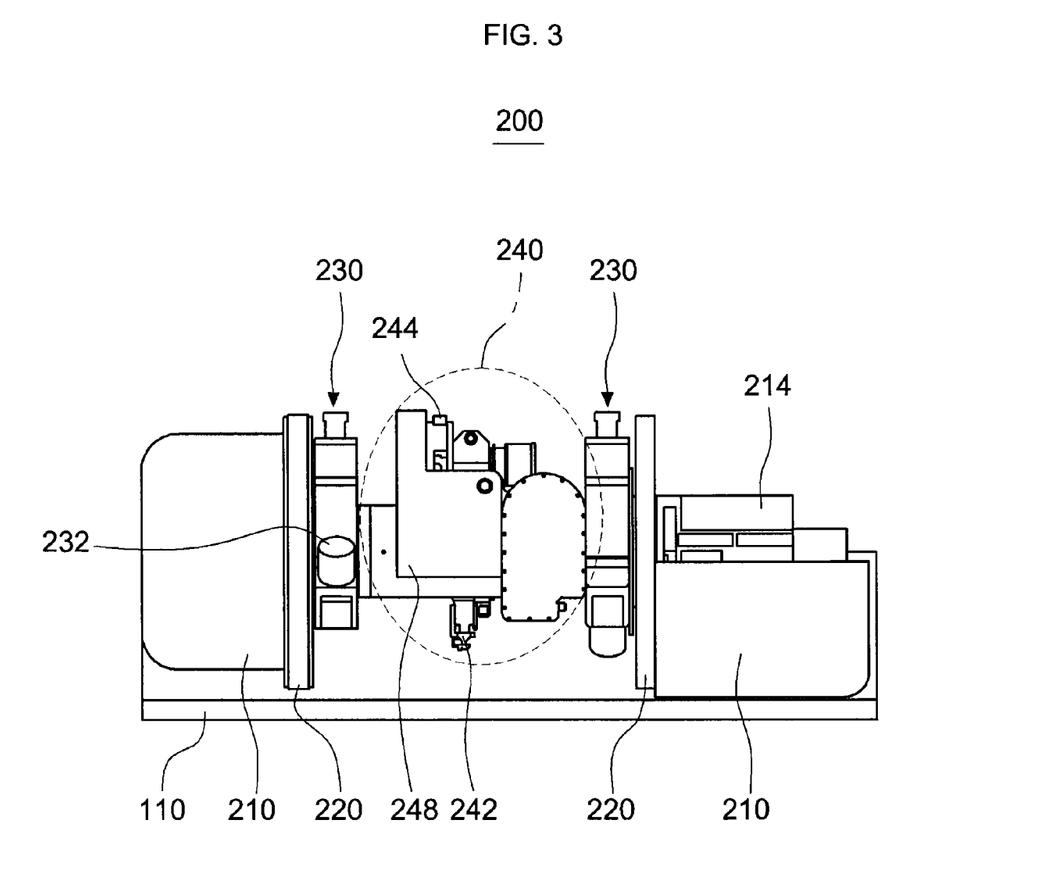
FIG. 3 is a plan view illustrating the machining, examination, welding integral device for a nozzle according to FIG. 2.

FIG. 2 is a front view illustrating a machining, examination, welding integral device 200 for a nozzle according to the present invention. FIG. 3 is a plan view illustrating the machining, examination, welding integral device 200 for a nozzle according to FIG. 2.

As illustrated in FIG. 2, the machining, examination, and welding integral device 200 for a nozzle includes a pair of caps 210 separated from each other to form a receiving part 212, a pair of foreign substance prevention layers 220 formed on surfaces of the pair of caps 210 that face each other, a pair of supporting members 230 fixing the machining, examination, and welding integral device 200 for a nozzle onto an inner wall of a nozzle 110 on the pair of foreign substance preventing layers facing each other, and a tool stand 240 received in the receiving part 212.

The tool stand 240 includes a welding unit 242 welding a junction part 120, which is formed on the bottom, a examination unit 244 examination whether the welding of the junction part 120 is defective, which is formed on the top, a machining unit 246 removing an existing welding portion and newly machining the corresponding portion, which is formed on one side, and a chip collector 248 vacuum-suctioning a by-product generated by the machining unit 246.

A second control unit 214 controlling the welding unit 242, the machining unit 246, and the examination unit 244 is provided in the pair of caps 210.

Herein, the welding unit 242, the machining unit 246, and the examination unit 244 weld, process, and examine the inner wall of the junction part 120 between the nozzle 110 and a pipe 130 and thus may move along the inner wall of the junction part 120 at 360°.

Further, the welding unit 242, the machining unit 246, and the examination unit 244 are controlled by a first control unit 215 (schematically shown in FIG. 2), and the first control unit is connected with the second control unit 214 outside a reactor vessel 100, and as a result, an operator controls examination driving, a machining condition, a welding route, and a welding condition through a control program embedded in the first control unit outside the reactor vessel 100.

A signal controlled by the first control unit is received by the second control unit 214 provided in the cap 210 directly connected with the welding unit 242, the machining unit 246, and the examination unit 244, and the second control unit 214 transfers the received signal to any one device of devices that perform corresponding operations, that is, the welding unit 242, the machining unit 246, and the examination unit 244.

While the pair of foreign substance preventing layers 220 are contracted, the pair of foreign substance preventing layers 220 are expanded to separate into a service space and a service-out space, foreign substances generated in machining and welding are prevented from flowing out to the outside of the service space, and external compressed air is supplied to the inside of the service space.

A plurality of support stands 232 formed to protrude radially at the center is provided in the pair of support members 230, the support stands 232 are configured in two layers to be fixed onto the inner wall of the nozzle 110, and at least the three support stands 232 are preferably provided radially at the center so as for the support members 230 to safely support the machining, examination, and welding integral device 200 for a nozzle.

The machining, examination, and welding integral device 200 for nozzle which is configured as described above is moved by a conveyance positioner 300 device to move to the inside of the nozzle 110 of the reactor vessel 100.

A detailed configuration of the conveyance positioner 300 will be described below with reference to FIG. 4.

Figure 4:
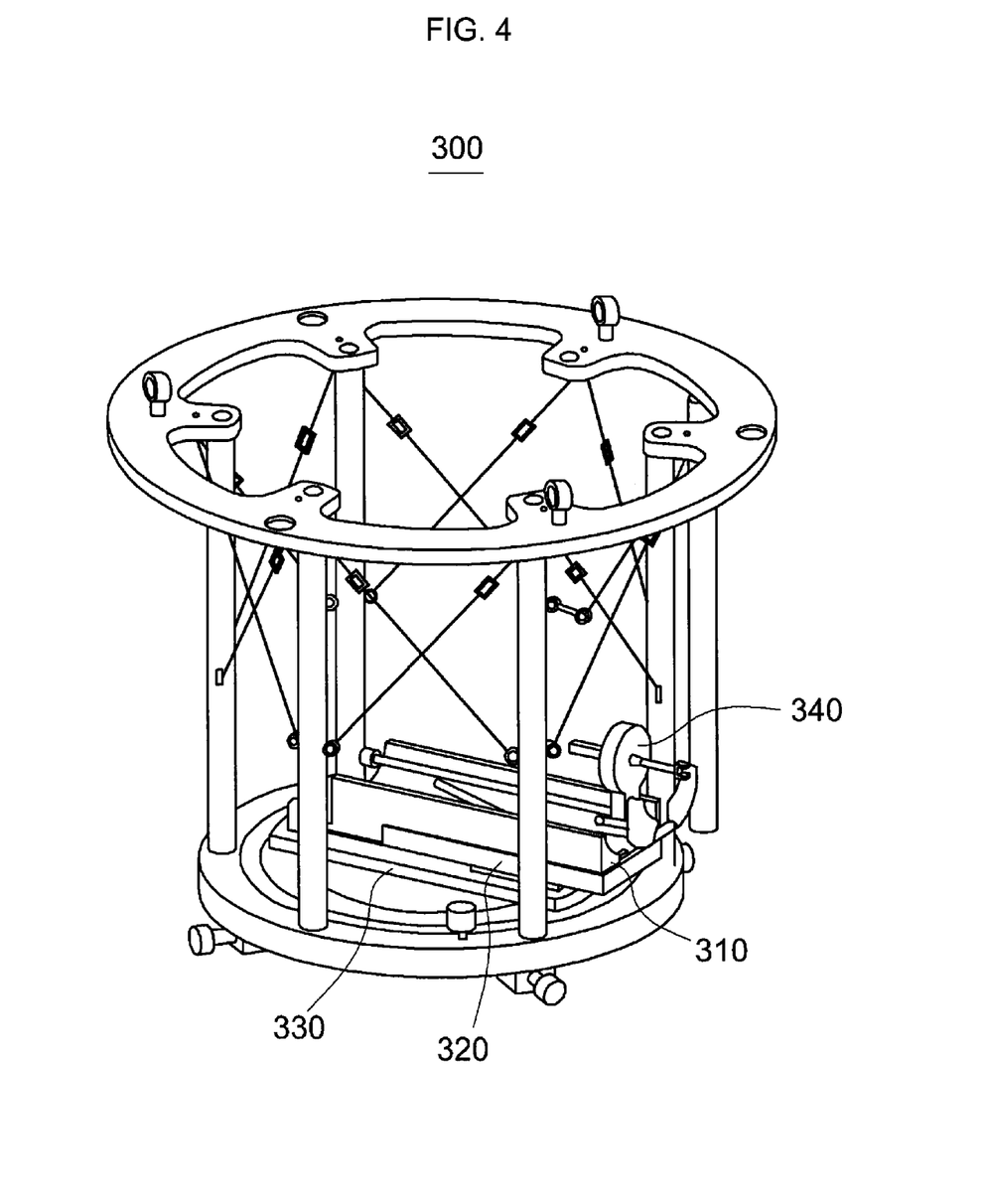
FIG. 4 is a perspective view illustrating a conveyance positioner to which the machining, examination, and welding integral device for a nozzle of FIG. 2 are conveyed.

FIG. 4 is a perspective view illustrating the conveyance positioner 300 to which the machining, examination, and welding integral device 200 for a nozzle is conveyed.

As illustrated in FIG. 4, the conveyance positioner 300 is a device which is coupled to the inside of the reactor vessel 100 to move the machining, examination, and welding integral device 200 for a nozzle to the inside of the nozzle 110.

The conveyance positioner 300 includes a seating part 310 on which the machining, examination, and welding integral device 200 for a nozzle is seat, a vertical guide unit 320 installed on the bottom of the seating part 310 to vertically drive the seating part 310, and a rotating plate 330 rotating the seating part 310.

Further, a shaft driver 340 is coupled in a vertical direction at a terminal of the seating part 310, the shaft driver 340 is connected with a terminal of the cap 210 of the machining, examination, and welding integral device 200 for a nozzle, and the machining, examination, and welding integral device 200 for a nozzle is inserted into the nozzle 110 by pressurizing the machining, examination, and welding integral device 200 for a nozzle by using the shaft driver 340.

Figure 5:
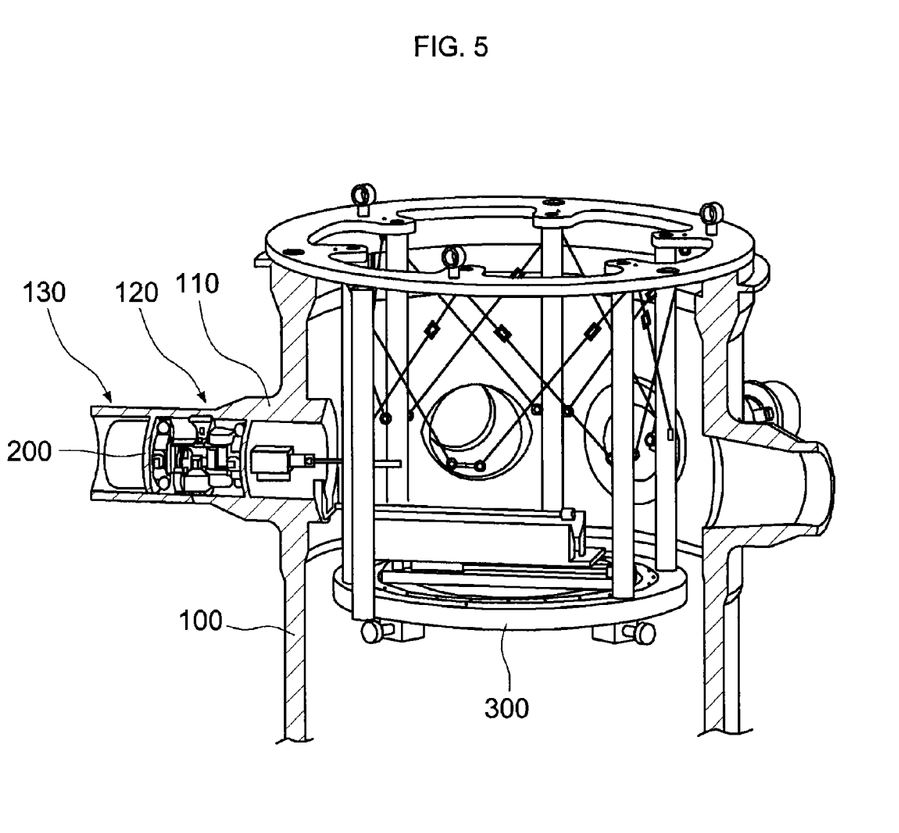
FIG. 5 is a perspective view illustrating a state in which the conveyance positioner and the machining, examination, and welding integral device for a nozzle are mounted, which are installed in a reactor vessel.

FIG. 5 is a perspective view illustrating a state in which the conveyance positioner 300 and the machining, examination, and welding integral device 200 for a nozzle mounted are mounted, which are installed in a reactor vessel.

As illustrated in FIG. 5, cooling water is filled in a nuclear fuel refilling water tank, the conveyance positioner 300 is inserted into the reactor vessel 100 and thereafter, the conveyance positioned is fixed by using a flange surface of a reactor vessel so as to move the machining, examination, and welding integral device 200 for a nozzle from an inlet/outlet of the reactor vessel 100 to the inside of the nozzle 110 while nuclear fuel in the reactor vessel 100 and internals in the reactor vessel 100 which is drawn out.

Thereafter, the machining, examination, and welding integral device 200 for a nozzle is seated on the seating part 310 of the conveyance positioner 300, the machining, examination, and welding integral device 200 for a nozzle moves down to an inlet of the nozzle 110 by using the vertical guide unit 320 provided on the bottom of the seating part 310, and the machining, examination, and welding integral device 200 for a nozzle is positioned in front of the inlet of the nozzle 110 to be serviced by using the rotating plate 330.

Further, the machining, examination, and welding integral device 200 for a nozzle is inserted into the nozzle 110 to be serviced by using the shaft driver 340 coupled to the seating part 310.

Hereinafter, a driving method of the machining, examination, and welding integral device 200 for a nozzle which is disposed in the nozzle 110 will be described.

As illustrated in FIG. 5, the machining, examination, and welding integral device 200 for a nozzle which is inserted into the nozzle 110 is positioned in a service part in the nozzle 110 and the support stand 232 of the support member 230 provided in the machining, examination, and welding integral device 200 for a nozzle is attached and strongly supported onto the inner wall of the nozzle 110.

An operator checks a defective part of the junction part 120 in the nozzle 110 by driving the examination unit 244 with the first control unit (not illustrated) and when the examination is completed, the service space is isolated from the service-out space by expanding the foreign substance preventing layer 220 so as to prevent the foreign substances generated in machining and welding from flowing out to the outside of the service space.

By isolating the service space by expanding the foreign substance preventing layer 220, the service space is maintained in a completely dry state by supplying compressed air to the inside of the service space outside while making water to flow into the service space and from the service space.

Thereafter, a part of an existing welding part which was welded to the junction part 120 is removed by actuating the machining unit 246 and the foreign substances generated in this case are vacuum-suctioned through the chip collector 248 to be removed.

Welding is performed in the processed junction part with alloy 52 filler metal by using the welding unit 242 and finishing machining is performed while the part of the junction part 120 welded by using the machining unit 246 is checkable.

When the machining is completed, water is filled in the service space by contracting the foreign substance preventing layer 220 and a state of the serviced junction part 120 is verified by using the examination unit 244.

When the serviced junction part 120 is not defective, the conveyance positioner 300 and the machining, examination, and welding integral device 200 for a nozzle are removed from the inside of the reactor vessel 110 after the machining, examination, and welding integral device 200 for a nozzle is drawn out from the inside of the nozzle 110 by using the conveyance positioner 300.

As described above, in the machining, examination, and welding integral device 200 for a nozzle according to the exemplary embodiment of the present invention, the machining device, the examination device, and the welding device are integrally provided in the housing and the operator controls the machining device, the examination device, and the welding device to perform operations through the control unit according to a required process, and as a result, since the operator does not replace the devices required according to the processes by hand, the devices required according to the processes are operable at the same operating position.

Further, since the operator does not perform the operation in a zone polluted by radioactivity by performing the operation by moving the machining, examination, and welding integral device for a nozzle into the nozzle in the reactor vessel with the conveyance positioner, a safe operation is performed.

As described above, although the machining, examination, and welding integral device for a nozzle according to the exemplary embodiment of the present invention has been described, it is obvious to the person skilled in the art that modification, changes, and various modified exemplary embodiments can be made within the scope without departing from the spirit of the present invention.

What is claimed is:

1. A machining, examination, and welding integral device for a nozzle, comprising:
    a pair of caps separated from each other, wherein the pair of caps includes a first cap having a surface, and a second cap having a surface, and the surface of the first cap and the surface of the second cap face each other;
    a pair of foreign substance preventing layers for preventing foreign substances in a service space in the device from flowing out to an outside of the service space, the pair of foreign substance preventing layers having a first foreign substance preventing layer and a second foreign substance preventing layer;
    a welding unit provided between the pair of foreign substance preventing, layers to weld a junction part of the nozzle and a pipe;
    an examination unit coupled to the welding unit to examine whether the junction part is defective;
    a machining unit coupled to the welding unit to remove a surface of a welded portion of the junction part and/or process the welded portion of the junction part; and
    a pair of supporting members for fixing the device to the nozzle, the pair of supporting members including a first supporting member provided on the first foreign substance preventing layer and a second supporting member provided on the second foreign substance preventing layer,
    wherein the first foreign substance preventing layer is provided on the surface of the first cap of the pair of caps, and the second foreign substance preventing layer is provided on the surface of the second cap of the pair of caps, and the first foreign substance preventing layer and the second foreign substance prevention layer face each other, and
    wherein each of the first supporting member and the second supporting member includes a plurality of support stands formed to protrude radially with respect to a longitudinal direction of the nozzle toward an inner wall of the nozzle.

2. The machining, examination, and welding integral device for a nozzle of claim 1, further comprising:
    a control unit controlling the welding unit, the machining unit, and the examination unit.

3. The machining, examination, and welding integral device for a nozzle of claim 2, wherein:
    the control unit is connected with another control unit positioned outside the device and is provided in one of the first and second caps of the pair of caps, and transmits signals received from the another control unit to the examination unit, the welding unit, and the machining unit.

4. The machining, examination, and welding integral device for a nozzle of claim 1, wherein:
    the welding unit, the machining unit, and the examination unit are rotatable along an inner wall of the nozzle by 360°.

5. The machining, examination, and welding integral device for a nozzle of claim 1, wherein:
    the machining, examination, and welding integral device for a nozzle is inserted into the nozzle by a conveyance positioner installed in a reactor vessel.

6. The machining, examination, and welding integral device for a nozzle of claim 5, wherein:

the conveyance positioner includes,
  a seating part on which the machining, examination, and welding integral device for a nozzle is seated for conveyance;
  a vertical guide unit installed on the bottom of the seating part to vertically drive the seating part; and
  a rotating plate rotating the seating part.

7. The machining, examination, and welding integral device for a nozzle of claim 1, wherein:
  the junction part is welded by using an alloy material.

8. The machining, examination, and welding integral device for a nozzle of claim 1, wherein the first foreign substance preventing layer and the second foreign substance preventing layer are expandable to separate a space in the device into the service space and a service-out space and to prevent the foreign substances generated during operations of the welding unit and the machining unit from flowing out from the service space to the outside of the service space.

\* \* \* \* \*